United States Patent
Gerrese

(10) Patent No.: US 12,065,165 B2
(45) Date of Patent: Aug. 20, 2024

(54) ADAPTIVE PRIVACY FOR SHARED RIDES

(71) Applicant: GM Cruise Holdings LLC, San Francisco, CA (US)

(72) Inventor: Alexander Willem Gerrese, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 337 days.

(21) Appl. No.: 17/511,077

(22) Filed: Oct. 26, 2021

(65) Prior Publication Data

US 2023/0126561 A1 Apr. 27, 2023

(51) Int. Cl.
*B60W 60/00* (2020.01)
*B60K 35/00* (2024.01)
*B60K 35/29* (2024.01)
*B60N 2/00* (2006.01)
*B60W 40/08* (2012.01)
*G06F 21/62* (2013.01)
*G06V 20/59* (2022.01)
*G08G 1/00* (2006.01)

(52) U.S. Cl.
CPC ......... *B60W 60/0013* (2020.02); *B60K 35/00* (2013.01); *B60N 2/002* (2013.01); *B60W 40/08* (2013.01); *G06F 21/6245* (2013.01); *G08G 1/202* (2013.01); *B60K 35/29* (2024.01); *B60K 2360/195* (2024.01); *B60W 2040/0881* (2013.01); *G06V 20/593* (2022.01)

(58) Field of Classification Search
CPC ............. B60W 60/0013; B60W 40/08; B60W 2040/0881; B60W 60/0024; B60K 35/00; B60K 2370/195; B60K 2370/175; B60K 2370/182; B60K 2370/566; B60N 2/002; G06F 21/6245; G08G 1/202; G08G 1/205; G06V 20/593
See application file for complete search history.

(56) References Cited

U.S. PATENT DOCUMENTS 10,466,392 B1* 11/2019 Melcher .............. G02F 1/13439
11,618,320 B1* 4/2023 Austria ................. B60K 35/00
701/36
2017/0349184 A1* 12/2017 Tzirkel-Hancock .... G06F 3/167
(Continued)

FOREIGN PATENT DOCUMENTS

JP 2019133354 A * 8/2019

OTHER PUBLICATIONS

Machine translation of 2019133354 A (Year: 2019).*

*Primary Examiner* — James J Lee
*Assistant Examiner* — Alexander George Matta

(57) ABSTRACT

Systems and methods for adapting various autonomous vehicle settings to protect personal information based on the composition of passengers in a vehicle. In particular, sensitive user information is intelligently parsed out or generalized based on user preference and the presence of unknown passengers. In some examples, sensitive user information is routed to more secure channels such as a mobile device application or a personalized display. In some implementations, the position of passengers within a vehicle is determined to identify which displays are in each passenger's field of view. Additionally, pick-up and drop-off locations can be scrambled to nearby destinations to obscure a home address, work address, or other identifiable address information.

20 Claims, 8 Drawing Sheets

(56) References Cited

U.S. PATENT DOCUMENTS

2018/0097829 A1* 4/2018 Muttik ................ H04L 63/101
2021/0004486 A1   1/2021 Adams et al.
2021/0223051 A1* 7/2021 Hochberg .......... G06Q 10/0631

* cited by examiner

ADAPTIVE PRIVACY FOR SHARED RIDES

FIELD OF THE DISCLOSURE

The present disclosure relates generally to autonomous vehicles (AVs) and to systems and methods for vehicle settings.

BACKGROUND

Autonomous vehicles, also known as self-driving cars, driverless vehicles, and robotic vehicles, are vehicles that use multiple sensors to sense the environment and move without human input. Automation technology in the autonomous vehicles enables the vehicles to drive on roadways and to accurately and quickly perceive the vehicle's environment, including obstacles, signs, and traffic lights. The vehicles can be used to pick up passengers and drive the passengers to selected destinations. The vehicles can also be used to pick up packages and/or other goods and deliver the packages and/or goods to selected destinations.

Autonomous vehicles can be used to provide rides to passengers for various types of errands and outings. In some examples, multiple unrelated passengers can share a vehicle. However, for some users, sharing a ride with one or more strangers can present potential safety and privacy concerns.

SUMMARY

Systems and methods are provided to adapt various autonomous vehicle settings to protect personal information based on the composition of passengers in a vehicle. In particular, pooled autonomous vehicle rides introduce a unique situation in which in-vehicle displays could present a privacy concern if displaying personal information such as a passenger's name, address, preferences, etc. In general, sensitive user information is intelligently parsed out or generalized based on user preference and the presence of unknown passengers. In some examples, sensitive user information is routed to more secure channels such as a mobile device application or a personalized display. In some implementations, the position of passengers within a vehicle is determined to identify which displays are in each passenger's field of view. Additionally, pick-up and drop-off locations can be scrambled to nearby destinations to obscure a home address, work address, or other identifiable address information.

According to one aspect, a method for adaptive privacy settings comprises receiving a shared ride request for a first passenger ride including a first pick-up location and a first drop-off location; selecting an autonomous vehicle to fulfill the shared ride request; determining that a second passenger is in the autonomous vehicle during at least a portion of the first passenger ride; and adapting in-cabin privacy settings to protect first and second passenger personally identifiable information, during the portion of the first passenger ride.

In some implementations, the method further comprises restricting available in-cabin features during the portion of the first passenger ride. In some implementations, adapting in-cabin privacy settings to protect first and second passenger personally identifiable information includes adapting information displayed on a display screen, and the adapting the information includes at least one of changing a name, removing a name, changing an address, hiding address information, and hiding preferences.

In some implementations, the method further comprises determining a first passenger seat location in the autonomous vehicle; and determining a second passenger seat location in the autonomous vehicle. In some implementations, the method further comprises determining that a first passenger display screen is visible from the second passenger seat location; and redacting the first passenger personally identifiable information from the first passenger display screen. In some implementations, the method further comprises providing the first passenger personally identifiable information to a first passenger via a secure interface, wherein the secure interface is out of a second passenger field of view. In some implementations, the method further comprises receiving first passenger shared ride privacy preferences.

In some implementations, determining that the second passenger is in the autonomous vehicle during the portion of the first passenger ride comprises determining that the second passenger is in the autonomous vehicle at first passenger pick-up, and further comprising: identifying a suggested pick-up location a selected distance from the first pick-up location and providing the suggested pick-up location to a first passenger mobile device. In some implementations, determining that the second passenger is in the autonomous vehicle during the portion of the first passenger ride comprises determining that the second passenger is in the autonomous vehicle at first passenger drop-off, and further comprising: identifying a suggested drop-off location a selected distance from the first drop-off location and providing the suggested drop-off location to a first passenger mobile device.

According to another aspect, a method for adaptive privacy settings, comprises determining that a first and second unrelated passengers are in an autonomous vehicle during a shared ride; adapting in-cabin privacy settings to protect first and second passenger personally identifiable information, during the shared ride, wherein adapting in-cabin privacy settings includes obfuscating passenger names and addresses.

According to another aspect a system for adaptive privacy settings in an autonomous vehicle fleet comprises a ridehail application configured to: receive an autonomous vehicle shared ride request for a first passenger ride including a first pick-up location, a first drop-off location, and shared ride privacy settings; and a central computing system configured to: receive the autonomous vehicle shared ride request for the first passenger ride, select an autonomous vehicle for the shared ride request from the autonomous vehicle fleet, determine that a second passenger is scheduled to be in the autonomous vehicle during at least a portion of the first passenger ride, and transmit the shared ride privacy settings to the autonomous vehicle.

In some implementations, the shared ride privacy settings include removing first passenger personally identifiable information from autonomous vehicle visual displays and in-cabin audio, and wherein the autonomous vehicle is configured to apply the shared ride privacy settings inside a vehicle cabin. In some implementations, the autonomous vehicle is configured to communicate the first passenger personally identifiable information to a first passenger via a secure interface, wherein the secure interface is out of a second passenger field of view. In some implementations, the central computing system is further configured to: determine that the second passenger scheduled to be in the autonomous vehicle during the portion of the first passenger ride that includes first passenger pick-up, and identify a suggested pick-up location a selected distance from the first pick-up location and provide the suggested pick-up location to the ridehail application. In some implementations, the central computing system is further configured to: determine that the second passenger scheduled to be in the autonomous vehicle during the portion of the first passenger ride that includes first passenger drop-off, and identify a suggested drop-off location a selected distance from the first drop-off location and provide the suggested drop-off location to the ridehail application.

According to another aspect, an autonomous vehicle for adapting privacy settings, comprises a plurality of sensors inside the autonomous vehicle configured to detect first and second passengers in the autonomous vehicle cabin; and an onboard computer in the autonomous vehicle configured to: determine that the first and second passengers are unconnected; and adapt in-cabin settings to protect first and second passenger personally identifiable information, including modifying information displayed on a display screen and modifying information played over in-cabin loudspeakers. In some implementations, the onboard computer is further configured to determine when the autonomous vehicle cabin is occupied by a single passenger and adapt the in-cabin settings to a full feature mode.

In some implementations, the onboard computer is further configured to receive first and second passenger privacy settings, and wherein the in-cabin settings are adjusted according to the first and second passenger privacy settings. In some implementations, the onboard computer is configured to send first passenger personally identifiable information to a first passenger mobile device and to send second passenger personally identifiable information to a second passenger mobile device. In some implementations, the onboard computer is further configured to receive sensor data from the plurality of sensors and determine a first passenger seat location and a second passenger seat location. In some implementations, the onboard computer is further configured to: determine that a first passenger display screen is visible from the second passenger seat location; and redact the first passenger personally identifiable information from the first passenger display screen. In some implementations, the onboard computer is further configured to communicate with a central computing system, the central computing system is configured to receive a shared ride request for a first passenger ride including first passenger privacy settings, and transmit the shared ride request to the onboard computer.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

To provide a more complete understanding of the present disclosure and features and advantages thereof, reference is made to the following description, taken in conjunction with the accompanying figures, wherein like reference numerals represent like parts, in which.

DETAILED DESCRIPTION

Overview

Systems and methods are provided to adapt various autonomous vehicle settings to protect personal information based on the composition of passengers in a vehicle. In particular, pooled autonomous vehicle rides introduce a unique situation in which in-vehicle displays could present a privacy concern if displaying personal information such as a passenger's name, address, preferences, etc. In general, sensitive user information is intelligently parsed out or generalized based on user preference and the presence of unknown passengers. In some examples, sensitive user information is routed to more secure channels such as a mobile device application or a personalized display. In some implementations, the position of passengers within a vehicle is determined to identify which displays are in each passenger's field of view. Additionally, pick-up and drop-off locations can be scrambled to nearby destinations to obscure a home address, work address, or other identifiable address information.

Safety and privacy are two important drivers of consumer trust, and protection of consumer safety and privacy is important for rideshare and autonomous vehicle companies to consider. With manually driven rideshare vehicles, various options are offered to make riders feel safe with drivers, and vice versa. With autonomous vehicles, passengers should feel safe with other passengers in pooled ride situations. For example, in a pooled ride without special privacy precautions, a passenger could easily learn another passenger's name and exact pick-up and/or drop-off address, as well as certain preferences, which could open up avenues for stalking and other forms of online and/or physical abuse.

Additional potential attack surfaces include personal screens, communal screens, and in-car audio. However, removing all personalization in all circumstances is unnecessary. For example, when passengers are alone in the cabin or are riding with a trusted party, some personalization can still be offered. Additionally, various passengers may have different levels of comfort with the sharing of selected personal information. Thus, a more nuanced solution to protecting personal information is provided.

The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Other objects, advantages and novel features of the disclosure are set forth in the proceeding in view of the drawings where applicable.

Example Autonomous Vehicle Configured for Adaptive Privacy

Figure 1A:
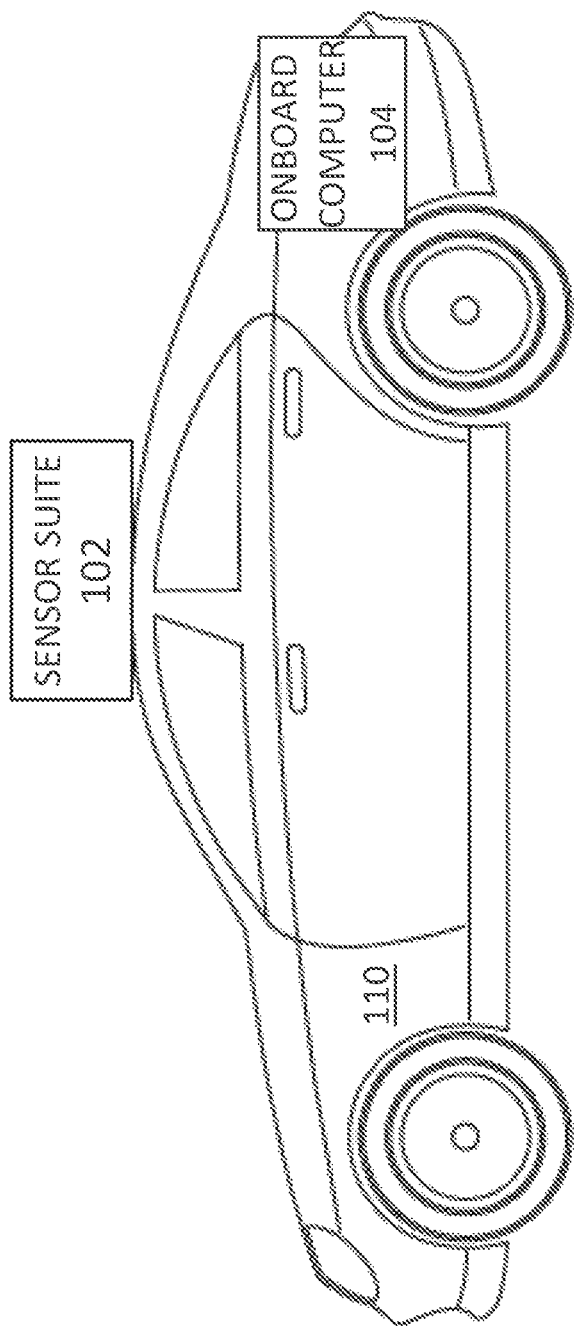
FIGS. 1A-1C are diagrams illustrating an autonomous vehicle, according to some embodiments of the disclosure.
Figure 1B:
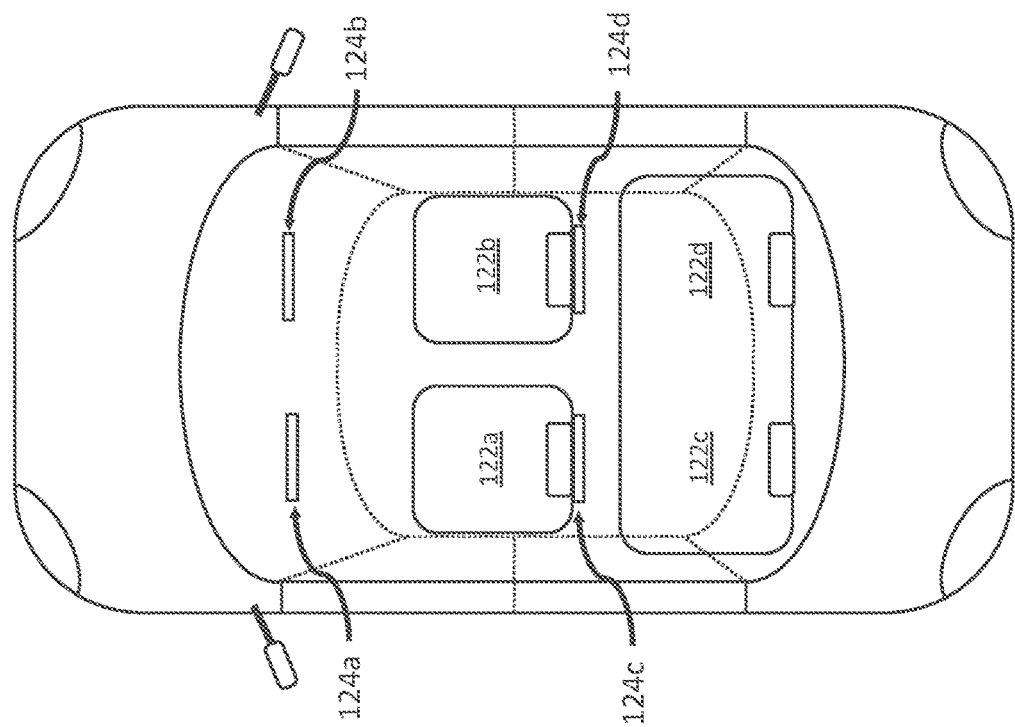
Figure 1C:
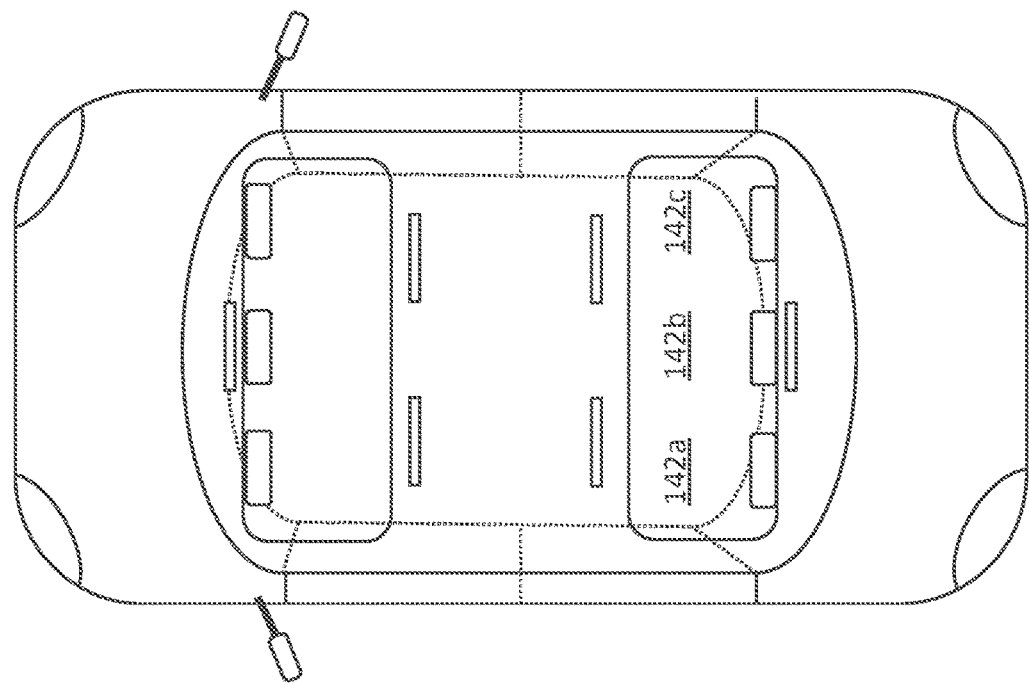

FIGS. 1A-1C are diagrams 100, 120, 140 illustrating an autonomous vehicle 110, according to some embodiments of the disclosure. The autonomous vehicle 110 includes a sensor suite 102 and an onboard computer 104. In various implementations, the autonomous vehicle 110 uses sensor information from the sensor suite 102 to determine its location, to navigate traffic, to sense and avoid obstacles, and to sense its surroundings. According to various implementations, the autonomous vehicle 110 is part of a fleet of vehicles for picking up passengers and/or packages and driving to selected destinations. The autonomous vehicle 110 is configured to provide adaptive privacy settings for shared rides.

The sensor suite 102 includes localization and driving sensors. For example, the sensor suite may include one or more of photodetectors, cameras, RADAR, SONAR, LIDAR, GPS, inertial measurement units (IMUs), accelerometers, microphones, strain gauges, pressure monitors, barometers, thermometers, altimeters, wheel speed sensors, and a computer vision system. The sensor suite 102 continuously monitors the autonomous vehicle's environment and, in some examples, sensor suite 102 data is used to detect selected events. In particular, data from the sensor suite 102 can be used to update a map with information used to develop layers with waypoints identifying selected events, the locations of the encountered events, and the frequency with which the events are encountered at the identified location. In some examples, data from the sensor suite 102 can include information regarding crowds and/or lines outside and/or around selected venues. Additionally, sensor suite 102 data can provide localized traffic information. In this way, sensor suite 102 data from many autonomous vehicles can continually provide feedback to the mapping system and the high fidelity map can be updated as more and more information is gathered.

In various examples, the sensor suite 102 includes cameras implemented using high-resolution imagers with fixed mounting and field of view. In further examples, the sensor suite 102 includes LIDARs implemented using scanning LIDARs. Scanning LIDARs have a dynamically configurable field of view that provides a point-cloud of the region intended to scan. In still further examples, the sensor suite 102 includes RADARs implemented using scanning RADARs with dynamically configurable field of view.

The autonomous vehicle 110 includes an onboard computer 104, which functions to control the autonomous vehicle 110. The onboard computer 104 processes sensed data from the sensor suite 102 and/or other sensors, in order to determine a state of the autonomous vehicle 110. In some implementations described herein, the autonomous vehicle 110 includes sensors inside the vehicle. In some examples, the autonomous vehicle 110 includes one or more cameras inside the vehicle. The cameras can be used to detect items or people inside the vehicle. In some examples, the autonomous vehicle 110 includes one or more weight sensors inside the vehicle, which can be used to detect items or people inside the vehicle. In some examples, the interior sensors can be used to detect passengers inside the vehicle. Based upon the vehicle state and programmed instructions, the onboard computer 104 controls and/or modifies driving behavior of the autonomous vehicle 110.

The onboard computer 104 functions to control the operations and functionality of the autonomous vehicle 110 and processes sensed data from the sensor suite 102 and/or other sensors in order to determine states of the autonomous vehicle. In some implementations, the onboard computer 104 is a general-purpose computer adapted for I/O communication with vehicle control systems and sensor systems. In some implementations, the onboard computer 104 is any suitable computing device. In some implementations, the onboard computer 104 is connected to the Internet via a wireless connection (e.g., via a cellular data connection). In some examples, the onboard computer 104 is coupled to any number of wireless or wired communication systems. In some examples, the onboard computer 104 is coupled to one or more communication systems via a mesh network of devices, such as a mesh network formed by autonomous vehicles.

According to various implementations, the autonomous driving system 100 of FIG. 1A functions to enable an autonomous vehicle 110 to modify and/or set a driving behavior in response to parameters set by vehicle passengers (e.g., via a passenger interface). Driving behavior of an autonomous vehicle may be modified according to explicit input or feedback (e.g., a passenger specifying a maximum speed or a relative comfort level), implicit input or feedback (e.g., a passenger's heart rate), or any other suitable data or manner of communicating driving behavior preferences.

The autonomous vehicle 110 is preferably a fully autonomous automobile, but may additionally or alternatively be any semi-autonomous or fully autonomous vehicle. In various examples, the autonomous vehicle 110 is a boat, an unmanned aerial vehicle, a driverless car, a golf cart, a truck, a van, a recreational vehicle, a train, a tram, a three-wheeled vehicle, a bicycle, or a scooter. Additionally, or alternatively, the autonomous vehicles may be vehicles that switch between a semi-autonomous state and a fully autonomous state and thus, some autonomous vehicles may have attributes of both a semi-autonomous vehicle and a fully autonomous vehicle depending on the state of the vehicle.

In various implementations, the autonomous vehicle 110 includes a throttle interface that controls an engine throttle, motor speed (e.g., rotational speed of electric motor), or any other movement-enabling mechanism. In various implementations, the autonomous vehicle 110 includes a brake interface that controls brakes of the autonomous vehicle 110 and controls any other movement-retarding mechanism of the autonomous vehicle 110. In various implementations, the autonomous vehicle 110 includes a steering interface that controls steering of the autonomous vehicle 110. In one example, the steering interface changes the angle of wheels of the autonomous vehicle. The autonomous vehicle 110 may additionally or alternatively include interfaces for control of any other vehicle functions, for example, windshield wipers, headlights, turn indicators, air conditioning, etc.

FIG. 1B shows a cutaway top view of the autonomous vehicle 110, according to various embodiments of the disclosure. As shown in FIG. 1B, there are four passenger seats 122a, 122b, 122c, 122d in the autonomous vehicle 110, arranged all facing forwards. In front of each passenger seat 122a, 122b, 122c, 122d is a screen 124a, 124b, 124c, 124d. In various examples, the screens 124a, 124b, 124c, 124d can be used for entertainment, virtual meetings, video conferences, to display trip information, or for any other visual display. In particular, a passenger sitting in the first seat 122a can view the first screen 124a, a passenger sitting in the second seat 122b can view the second screen 124b, a passenger sitting in the third seat 122c can view the third screen 124c, and a passenger sitting in the fourth seat 122d can view the fourth screen 124d. In various examples, however, passengers sitting in other seats can view other passenger's screens. For example, the passenger sitting in the back right seat 122d may be able to see the screen 124a that displays content for the passenger in the front left seat 122a. Similarly, the passenger sitting in the back left seat 122c may be able to see the screen 124b that displays content for the passenger in the front right seat 122*b*. In various examples, content displayed on each of the screens 124*a*, 124*b*, 124*c*, 124*d* is limited during a shared ride when other passengers are present in the vehicle and the passengers are strangers or otherwise unconnected to each other. For instance, the content displayed on each of the screens 124*a*, 124*b*, 124*c*, 124*d* is limited to protect individual passenger privacy. In some examples, the content available for display on each of the screens 124*a*, 124*b*, 124*c*, 124*d* is limited for the comfort of other vehicle passengers (e.g., one passenger may not want to witness a violent scene from a movie on another passenger's screen). In some examples, windows and/or other flat surfaces in the autonomous vehicle are adjusted to prevent a reflection of a passenger mobile device screen being visible to another passenger.

In some examples, each screen 124*a*-124*d* is equipped with a video camera, which can be used to video the respective passenger for a virtual meeting. Similarly, in some examples, each screen 124*a*-124*d* is equipped with a microphone, which can be used to pick-up the respective passenger's voice for a virtual meeting. However, in various implementations, and in order to protect passenger privacy, passengers may not be able to actively participate in a virtual meeting during a shared ride. In some examples, passenger microphone and video cameras are disabled during a shared ride.

In some implementations, a virtual meeting can take place in the autonomous vehicle during a shared ride. In some examples, the autonomous vehicle 110 includes multiple passengers, but only one of the passengers is participating in a virtual meeting. In some examples, any meeting joined from a shared ride includes alerts to others through the virtual meeting platform that the passenger is participating from a vehicle that includes other passengers. In some examples, a passenger can join a meeting using headphones and/or earphones such that other passengers are unlikely to be able to hear audio from the meeting. In some examples, multiple vehicle passengers attend virtual meetings in the vehicle 110. In some examples, multiple vehicle passengers attend the same meeting from different seats 122*a*-122*d* in the vehicle 110.

In various examples, the autonomous vehicle 110 can determine which seat each respective passenger is sitting in. That is, the autonomous vehicle 110 can determine that passenger A is sitting in the first seat 122*a*, passenger B is sitting in the second seat 122*b*, passenger C is sitting in the third seat 122*c*, and passenger D is sitting in the fourth seat 122*d*. In some examples, wireless technology such as NFC (Near Field Communication), Bluetooth, or inaudible sounds, can be used within the autonomous vehicle cabin to determine a passenger's mobile device location and infer passenger seat location. In some examples, an inaudible sound for mobile device location is a high frequency sound with a particular signature that is inaudible to humans but detectable by microphones. In various examples, the passenger mobile device can emit the inaudible sound and microphones in the autonomous vehicle detect the sound and determine device location. In some examples, multiple sensors are used to detect a signal and determine device location.

In some examples, computer vision can be used within the autonomous vehicle cabin to determine a passenger's seat location. In some examples, passengers are assigned a seat in the autonomous vehicle before entering the vehicle and informed of their designated seat via the rideshare application. The passenger can then confirm their seat location after entering the vehicle. In some examples, sensors determine that a passenger is sitting in a seat based on a seatbelt being buckled and/or using a seat weight sensor.

FIG. 1C shows a cutaway top view of the autonomous vehicle 110 with the interior seats facing each other, according to various embodiments of the disclosure. In particular, as shown in FIG. 1C, a first row of seats includes two seats 142*a*, 142*b* facing a first direction and a second row of seats includes two seats 144*a*, 144*b* facing the opposite direction. The seats 142*a*, 142*b* in the first row each face a display screen 152*a*, 152*b*, respectively. Similarly, the seats 144*a*, 144*b* in the second row each face a display screen 154*a*, 154*b*. Each seat 142*a*, 142*b*, 144*a*, 144*b* is thus associated with a personal display screen 152*a*, 152*b*, 154*a*, 154*b*, respectively. Passengers in each of the seats 142*a*, 142*b*, 144*a*, 144*b* can select what is displayed on their respective personal display screens 152*a*, 152*b*, 154*a*, 154*b*. As described herein, information available for display on the respective personal display screens 152*a*, 152*b*, 154*a*, 154*b* can vary based on whether other passengers are in the vehicle, as well as based on passenger profiles and privacy settings. In various examples, the respective personal display screens 152*a*, 152*b*, 154*a*, 154*b* are positioned over the opposite seats 142*a*, 142*b*, 144*a*, 144*b*. In some examples, the personal display screens are in different positions within the vehicle cabin.

In various implementations, the first row of seats 142*a*, 142*b* also faces a first additional display screen 162 and the second row of seats 152*a*, 152*b* also faces a second additional display screen 164. The first 162 and second 164 additional display screens are positioned above the opposite row of seats, centered between the seats in the opposite row. In various implementations, the first 162 and second 164 additional display screens display general ride information, such as the current location on a map, the time to the next stop, and the location of the next stop. The first 162 and second 164 additional display screens may also display vehicle information such as the inside and/or outside temperature, the vehicle speed, and the vehicle license plate (or other identifying information). In some examples, additional display screens can be positioned in other places in the vehicle and can be viewable from some or all passenger seats. For example, a display screen can be positioned along the side of the vehicle cabin.

Example Method for Adaptive Privacy Settings

Figure 2:
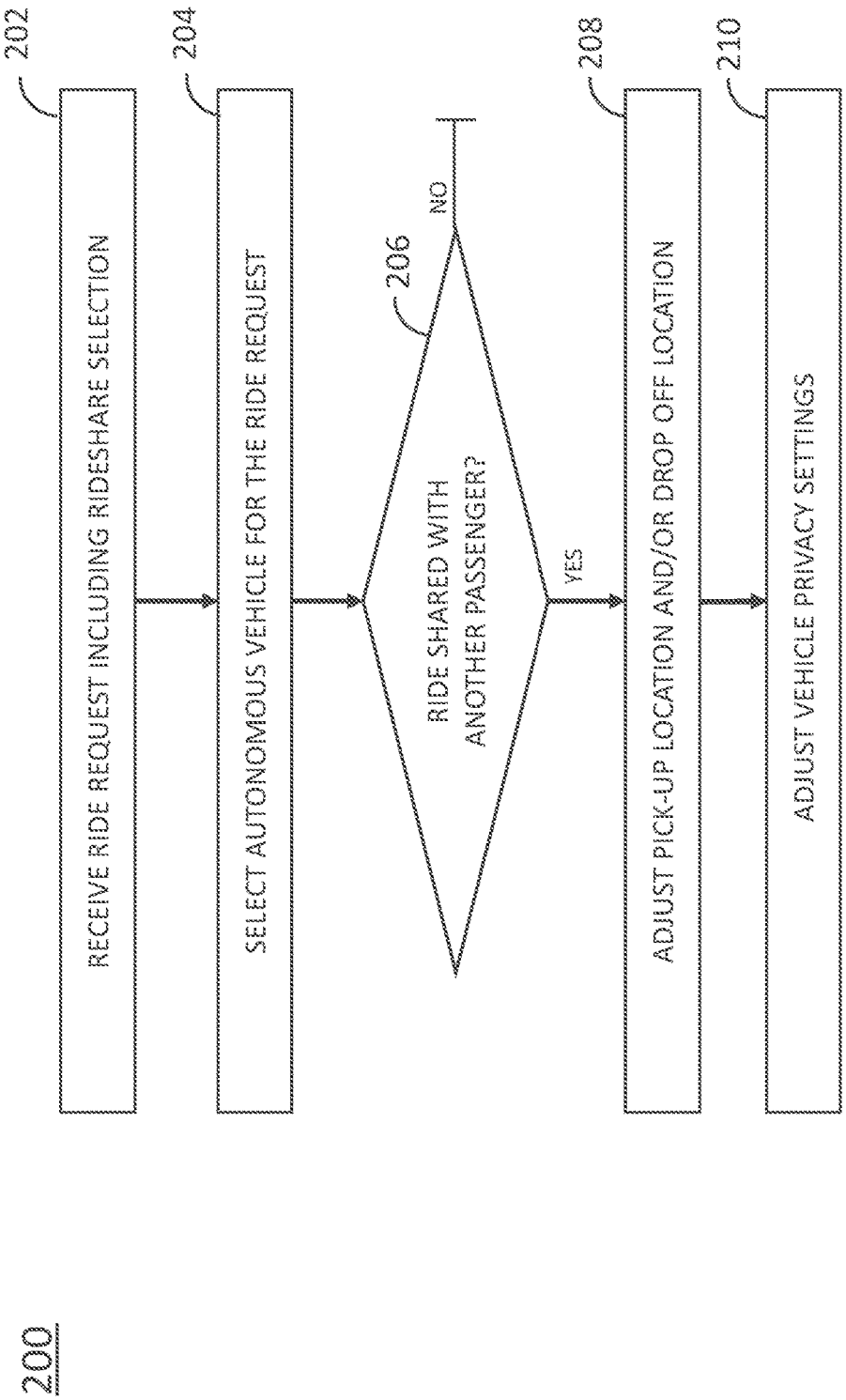
FIG. 2 is a diagram showing a method for autonomous vehicle adaptive privacy settings, according to some embodiments of the disclosure.
Figure 3:
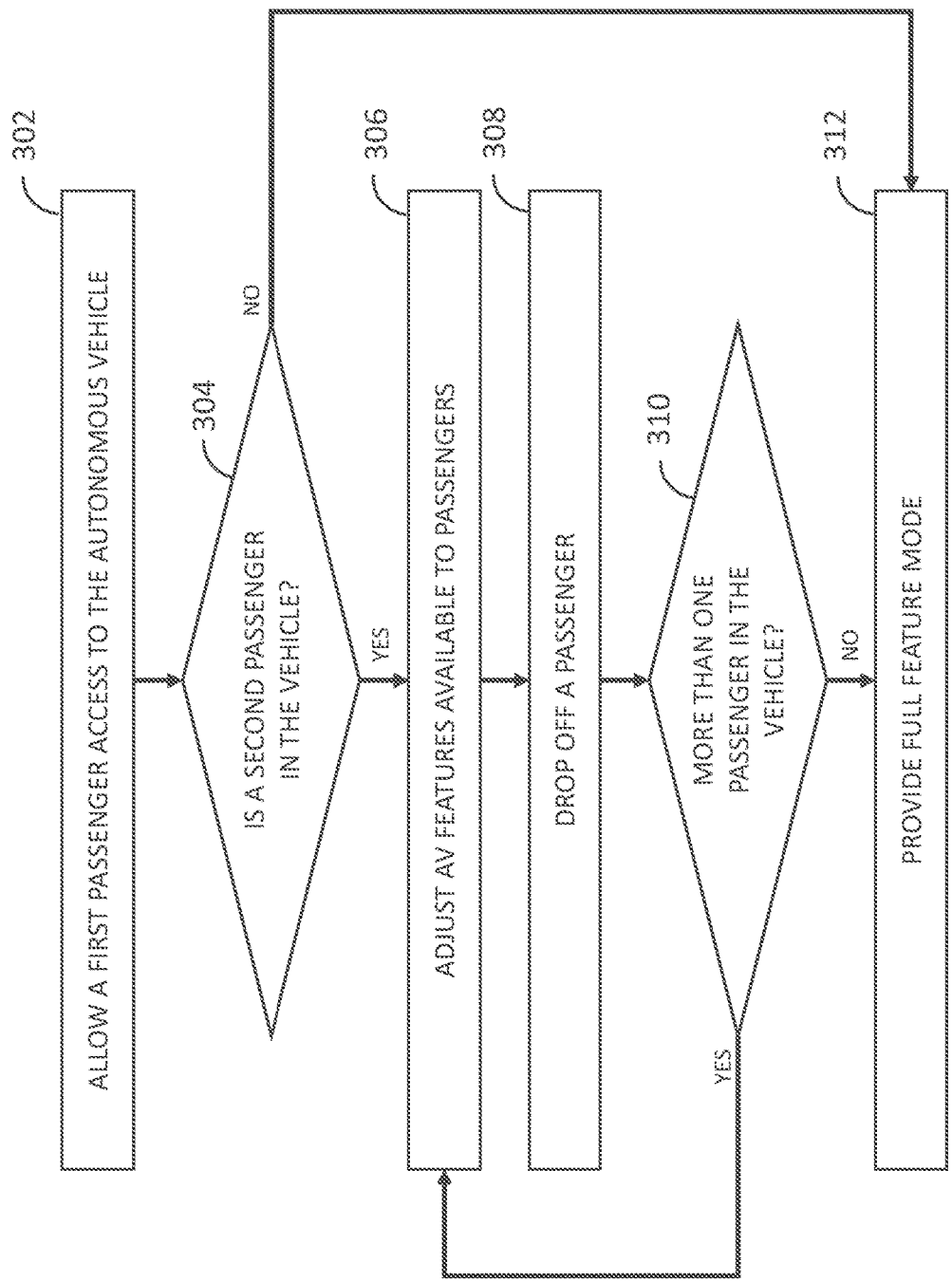
FIG. 3 is another diagram illustrating a method for providing adaptive privacy settings, according to some embodiments of the disclosure.

FIGS. 2 and 3 are diagrams illustrating methods 200, 300 for providing adaptive privacy settings, according to some embodiments of the disclosure. FIG. 2 illustrates a method 200 for determining whether a ride is shared with additional passengers and adjusting pick-up and/or drop-off location, as well as in-vehicle privacy settings and personalization, accordingly. At step 202, a first ride request including a rideshare selection is received. The rideshare selection indicates that the user is requesting a shared ride as opposed to a private ride. In various examples, shared rides are offered for a lower price than private rides, thereby incentivizing users to choose shared rides which help maximize autonomous vehicle fleet usage and decrease traffic and congestion. The ride request may be received by a central computing system and routing coordinator, as described in greater detail below.

At step 204, an autonomous vehicle from the ridehailing service autonomous vehicle fleet is selected to fulfill the ride request. At step 206, it is determined whether any portion of the ride as assigned to the selected autonomous vehicle will be shared with another passenger. If the ride will not be shared with any other passengers, the method 200 ends at step 206. If the ride will not be shared with any other passengers, there is no privacy concern and the entire autonomous vehicle platform can be leveraged to maximize the user experience. This can include offering personalized entertainment suggestions, detailed trip information, full detail audio messages over in-vehicle loudspeakers, saved vehicle preferences such as music and HVAC preferences, recent destination information, and suggested intermediate stops.

If the ride will be shared with other passengers, then during the time the passenger is sharing a cabin with others, various options may be unavailable. In some examples, the selected autonomous vehicle is already providing rides to one or more other passengers, and the passenger's ride request route is added to a current route. In some examples, the autonomous vehicle is routed to pick up multiple passengers whose ride request routes overlap. In various examples, the ride request route is added to already planned autonomous vehicle routes and overlaps with one or more other ride routes, such that the autonomous vehicle fulfills at least a portion of more than one ride request simultaneously. If the ride will be shared with other passengers, the method 200 proceeds to step 208.

At step 208, it is determined whether to adjust the ride request pick-up and/or drop off location to protect passenger privacy. In one example, the pick-up location is the passenger's home address, and the autonomous vehicle is scheduled to contain one or more other riders at passenger pick-up, and therefore the passenger pick-up location is changed to a location a selected distance away from the home address location. For example, the passenger pick-up location can be changed to a nearby intersection. In some instances, when the passenger pick-up location is adjusted to protect passenger privacy, the passenger pick-up location is selected to minimize autonomous vehicle detours and/or re-routing to the exact pick-up location. In another example, the drop-off location is the passenger's work address, and the autonomous vehicle is scheduled to contain one or more other riders at passenger drop-off, and therefore the passenger drop-off location is changed to a location a selected distance away from the work address location. In some instances, when the passenger drop-off location is adjusted to protect passenger privacy, the passenger drop-off location is selected to minimize autonomous vehicle detours and/or re-routing to the exact drop-off location. In various examples, adjusting the pick-up and/or drop-off location can be disabled for less important locations such as stores, event venues, or locations associated with one-time trips. In some examples, multiple unconnected passengers are picked up and/or dropped off at the same location and the pick-up and/or drop-off location is not adjusted. For instance, if multiple passengers are all heading to a sports venue for a game, the passengers can be dropped off at the venue without privacy concerns.

At step 210, when the passenger is sharing the vehicle cabin with other riders, the set of possible personalization features decreases. In particular, any function that affects the entire cabin is disabled. For example, full-cabin entertainment features are disabled, HVAC (heating, ventilation, air conditioning) personalization preferences are disabled, and suggested intermediate stops are disabled. Additionally, personal identifiable information is hidden for passenger privacy and to protect the passenger's identity. In some examples, in-cabin audio notification frequency and detail is decreased, and trip updates are focused on personal screens and/or on the mobile device application. In some examples, exact destination information is masked and any shortcuts and/or labels (e.g., "home" or "work") that may appear in the mobile device application are abstracted to nearby point-of-interest (POI) names or simply to a street name. In some examples, the user's real name is not used to reduce the possibility of revealing a user's identity and subsequent online stalking. A nickname can be used instead of a user's real name. The nickname can be selected by the user or randomly assigned by the rideshare application. In some examples, an avatar is used instead of a user's real name, and the avatar can be a personalized avatar selected by the user or randomly assigned by the rideshare application. Other examples of personally identifiable information include a phone number, email address, age, birthday, marital status, family information, religion, activities, medical information, education information, etc. Thus, for example, in a private ride, an autonomous vehicle might greet a passenger on their birthday with an audio "happy birthday!" message, but this would not be played in a shared ride. Any other messages (audio, visual, or other) that would provide information that could be personally identifiable could similarly be suppressed or modified during a shared ride based on personal privacy settings.

In some implementations, when a first passenger exits the vehicle, if another rider exits the vehicle prematurely at the first passenger's stop, the first passenger is notified. In some implementations, when a first passenger exits the vehicle, if another rider exits the vehicle prematurely at the first passenger's stop, quick access to emergency help services is provided. The access to emergency help services can be provided via the first passenger's mobile device and also can be provided by the autonomous vehicle itself. For instance, the autonomous vehicle can wait and monitor for emergency service requests, such a scream or a "help!" request and then connect with emergency service personnel as needed. In some examples, the autonomous vehicle ridehailing service can flag the autonomous vehicle for a live review of sensor video or other sensor data if another rider exits the vehicle prematurely at the first passenger's stop.

In various implementations, content available for display on personal display screens is adjusted based on seating arrangement and occupancy. In some examples, displays can be adjusted to remove any personal information. In some examples, certain content is unavailable, such as potentially offensive content, R-rated content, NC-17 rated content, and/or X-rated content. For example, a user's personal screen may still display personalized and/or sensitive information if there is no way that another passenger can view the user's personal screen. For instance, passengers who are sitting face-to-face or diagonally across from each other may not be able to see each other's personal display screens. In contrast, passengers sitting next to each other may be able to see each other's personal display screens.

In various examples, audio that is typically played over autonomous vehicle loudspeakers in the vehicle cabin is modified for privacy. The passenger's name can be replaced with a nickname and a destination name can be replaced with a general point-of-interest or intersection name. In some examples, a name can be replaced with a personalized avatar such that the autonomous vehicle can use the personalized avatar on display screens and instead of a name or nickname. In some examples, personal passenger information can be directed to the passenger if the passenger is wearing earphones or headphones. In some examples, the earphones are connected to an in-vehicle Bluetooth channel and the autonomous vehicle plays personalized content for the passenger directly to the passenger earphones via Bluetooth. In some examples, the earphones are connected to the passenger's mobile device, and a mobile device rideshare application plays personalized content for the passenger directly to the passenger earphones.

According to various implementations, the autonomous vehicle will automatically switch between modes as vehicle occupants change. Thus, during a single ride, a passenger may experience different levels of privacy and personalization. In various examples, users can adjust privacy settings from the ridehailing application on a mobile device. Thus, users can personalize their privacy risk profile.

In some implementations, multiple passengers are connected and/or known to each other but are picked up at different stops. For example, passengers may work for the same company and be heading to the same drop-off location (e.g., work, or a company event). In some examples, friends may meet up in an autonomous vehicle before heading to an event together. In some examples, the autonomous vehicle is configured to determine whether passengers are connected. In some examples, the ridehailing application is configured to determine whether passengers are connected. For instance, the ridehailing application can prompt each user to inquire whether they know another passenger. In various examples, autonomous vehicle privacy settings can be adjusted by the user, and a user can have different settings for rides with passengers to whom the user is connected and for rides with strangers (people with whom the user has no connection). In various examples, a user can opt for a higher degree of privacy even if the user is connected with other passengers.

In some implementations, passengers can change privacy settings during a ride. For example, a passenger may decide to play a video game with another passenger during a ride, and can change privacy settings to allow for playing a game together. In some examples, passengers may get to know each other during a ride and choose to share passenger information with each other via the rideshare application. In some examples, a passenger can send a message to another passenger via the rideshare application without receiving any personal information about the other passenger from the rideshare application. For instance, if a first passenger uses a nickname during a shared ride that is shared with the other passengers via in cabin audio and/or visual channels, a second passenger can see the first passenger's nickname and, via the rideshare application, send a message to the first passenger. In some examples, this option is available for a limited time during and following a ride (e.g., for two hours, eight hours, or 24 hours). In order to protect passenger privacy, the passenger receiving the message can, via the rideshare application, choose whether or not to accept the incoming message. If the passenger does not accept the incoming message, the message is deleted. If the passenger accepts the incoming message, the passenger can read the message. In various examples, the passenger can respond to the message via the rideshare application.

In one example, first and second passengers each request a ride and select a shared ride option. The first passenger is picked up at the first passenger's home address in an empty autonomous vehicle, such that the first passenger is the only passenger in the autonomous vehicle, and all personalization and other autonomous vehicle features are available to the first passenger. Then a second passenger is picked up at a location that is a few hundred feet away from the second passenger's home address, such that the first passenger cannot infer the second passenger's home address from the pick-up location. When the autonomous vehicle stops to pick up the second passenger, selected autonomous vehicle personalization features are disabled for both the first and second passengers, such as temperature control, autonomous vehicle speakers for personal entertainment, and some entertainment options on in-vehicle display screens. The autonomous vehicle proceeds to drop off the first passenger at a location nearby the first passenger's destination location. After the first passenger exits the vehicle, vehicle personalization features are enabled for the second passenger, who is subsequently dropped off at the second passenger's destination location.

FIG. 3 is a diagram illustrating another method 300 for providing adaptive privacy settings, according to various embodiments of the disclosure. The method 300 illustrates an example for adjusting privacy settings at the autonomous vehicle based on vehicle occupancy. At step 302, a first passenger is allowed access to an autonomous vehicle. At step 304, it is determined whether a second passenger is in the vehicle. If there are no other passengers in the vehicle at step 304, the method proceeds to step 312 and the full passenger experience including autonomous vehicle features is provided. If there are one or more other passengers in the vehicle at step 304, at step 306, autonomous vehicle features available to the passengers are adjusted, as discussed above. This includes both limiting personalization of full-cabin features (e.g., HVAC, surround sound), as well as limiting personal information displayed on in-vehicle display screens. Note that personalization features that do not affect other passengers (e.g., a heated seat) may still be available.

At step 308, a passenger is dropped off. In some examples, the second passenger is dropped off and the first passenger remains in the vehicle. In some examples, the first passenger is dropped off and the second passenger remains in the vehicle. In some examples, there may be additional passengers in the vehicle, such as a third and/or fourth passenger. In some examples, a third passenger is dropped off and the first and second passengers both remain in the vehicle.

At step 310, the autonomous vehicle determines whether more than one passenger remains in the vehicle. If multiple passengers remain in the vehicle, the method returns to step 306 and the features available to the passengers continue to be limited. If only one passenger remains in the autonomous vehicle, at step 262 the autonomous vehicle reverts to providing a full feature mode. Note that in some examples, multiple passengers can be friends or acquaintances or otherwise known to each other, such that they prefer to share a full feature experience. In some examples, passengers can agree to share a full feature mode, for example via their respective mobile device ridehailing applications. In other examples, passengers are strangers and vehicle settings are limited as described herein.

Example of an Adaptive Privacy Settings Interface

Figures 4A, 4B:
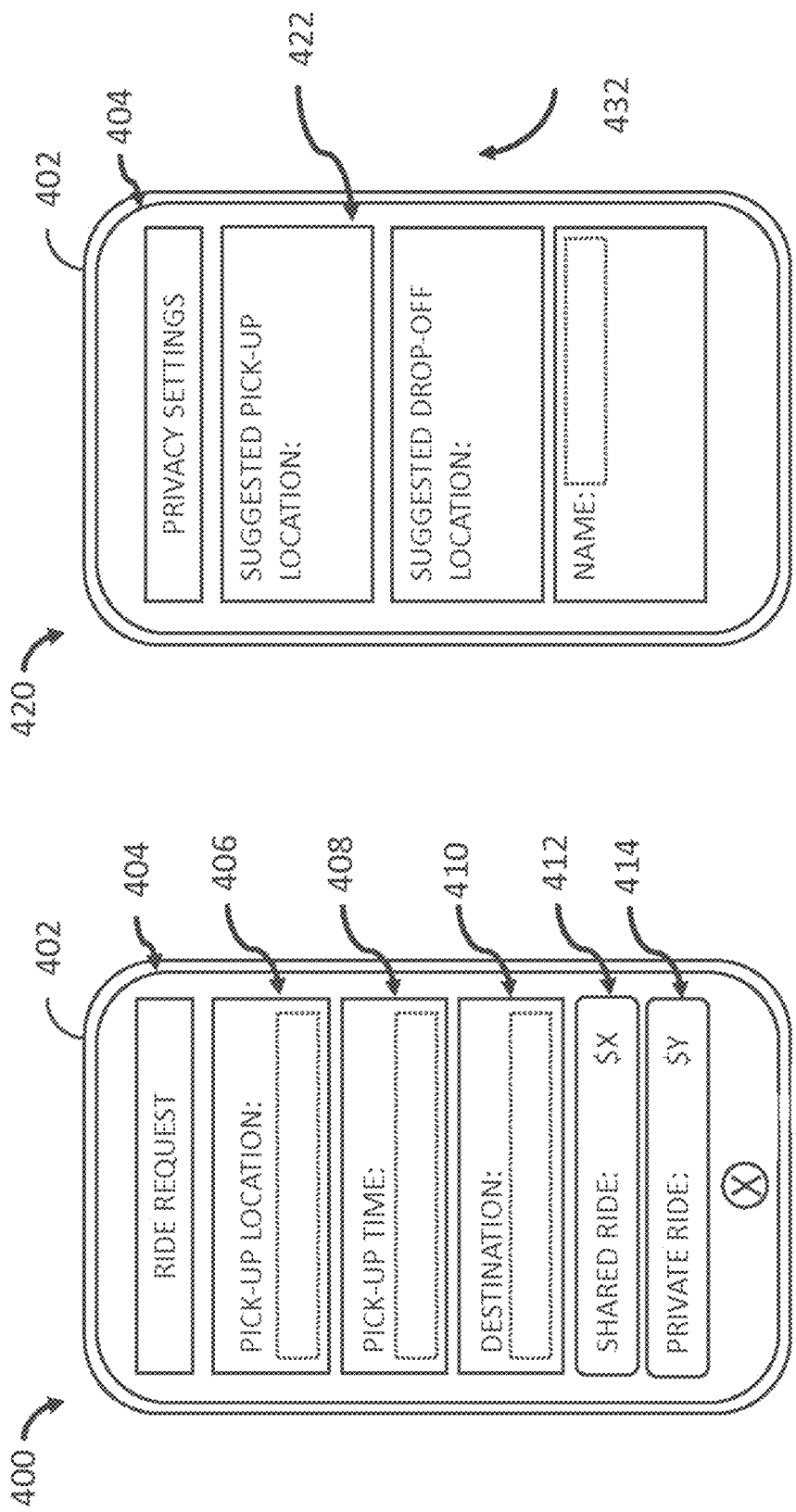
FIG. 4A-4B show examples of a rideshare application interface, according to some embodiments of the disclosure.

FIGS. 4A-4B show examples 400, 420 of an interface for adaptive privacy settings, according to some embodiments of the disclosure. FIG. 4A shows an example 400 of a device 402 showing an interface 404 for a ride request, including an option to request a shared ride. In particular, in FIG. 4A, the mobile device 402 screen shows an interface 404 for requesting a shared ride. The ride request interface includes an input box for a pick-up location 406, an input box for a pick-up time 408, and an input box for a destination 410. Once the user enters the ride request information in boxes 406, 408, 410, the ride request interface displays the price for a shared ride in the box 412 and the price for a private ride in the box 414. In various examples, the boxes 412, 414 are buttons and a user can select either a shared ride or a private ride by pressing the corresponding button 412, 414. In various implementations, a user may be incentivized to select a shared ride because the shared ride costs less than a private ride.

FIG. 4B shows an example 420 of a ridehailing application interface 404 for adjusting privacy settings, according to some embodiments of the disclosure. The privacy settings interface shown in the example 420 can be displayed after a user selects the shared ride option 412 in the ride request interface. In particular, when a user selects a shared ride, the privacy settings screen shows a suggested pick-up location in the first box 422, a suggested drop-off location in second box 414, and a suggested user nickname in the third box 426.

In some examples, if another rider will be in the autonomous vehicle at user pick-up, and the pick-up location entered in the ride request in box 406 is a private address (such as a home address), the rideshare application can suggest a pick-up location that is a short distance away from the requested pick-up location in order to keep the other rider from seeing the user's private address information. For instance, the suggested pick-up location can be at a nearby cross-road and/or intersection. In some examples, the user can select the first box 422 and the ridehailing application shows a map on which the user can select a different pick-up location than the one suggested in the first box 422. In some examples, the user pick-up address is not an address the user frequents, and/or the user may not be concerned about privacy regarding the requested pick-up address, and the user can request that the autonomous vehicle pick up the user the entered pick-up location.

In some examples, if another rider will be in the autonomous vehicle at user drop-off, and the drop-off location entered in the ride request in box 406 is a private address (such as a work address), the rideshare application can suggest a drop-off location that is a short distance away from the requested drop-off location in order to keep the other rider from seeing the user's private address information. For instance, the suggested drop-off location can be at a nearby cross-road and/or intersection. In some examples, the user can select the second box 424 and the ridehailing application shows a map on which the user can select a different drop-off location than the one suggested in the second box 424. In some examples, the user drop-off address is not an address the user frequents, and/or the user may not be concerned about privacy regarding the requested drop-off address, and the user can request that the autonomous vehicle drop off the user the entered drop-off location.

In various examples, the autonomous vehicle can address the user by name via in-cabin loudspeakers or on an in-cabin display screen. For example, when the autonomous vehicle reaches the user's drop-off location, the in-cabin loudspeakers may alert the user by name that they are at their drop-off location. Within the vehicle, a display screen can display each passenger's name and the estimated time to arrival at their respective destinations. Thus, in order to protect privacy, when selecting a shared ride, the user can select a name to be used by the autonomous vehicle during the ride. In particular, the user can enter any selected name in the third box 426 of the privacy settings display screen. In some examples, the ridehailing application can suggest a name in the third box 426, such as a previously-used name, and the user can change the suggested name using via the third box 426 by deleting the suggested name and entering another name.

Example of Autonomous Vehicle Fleet

Figure 5:
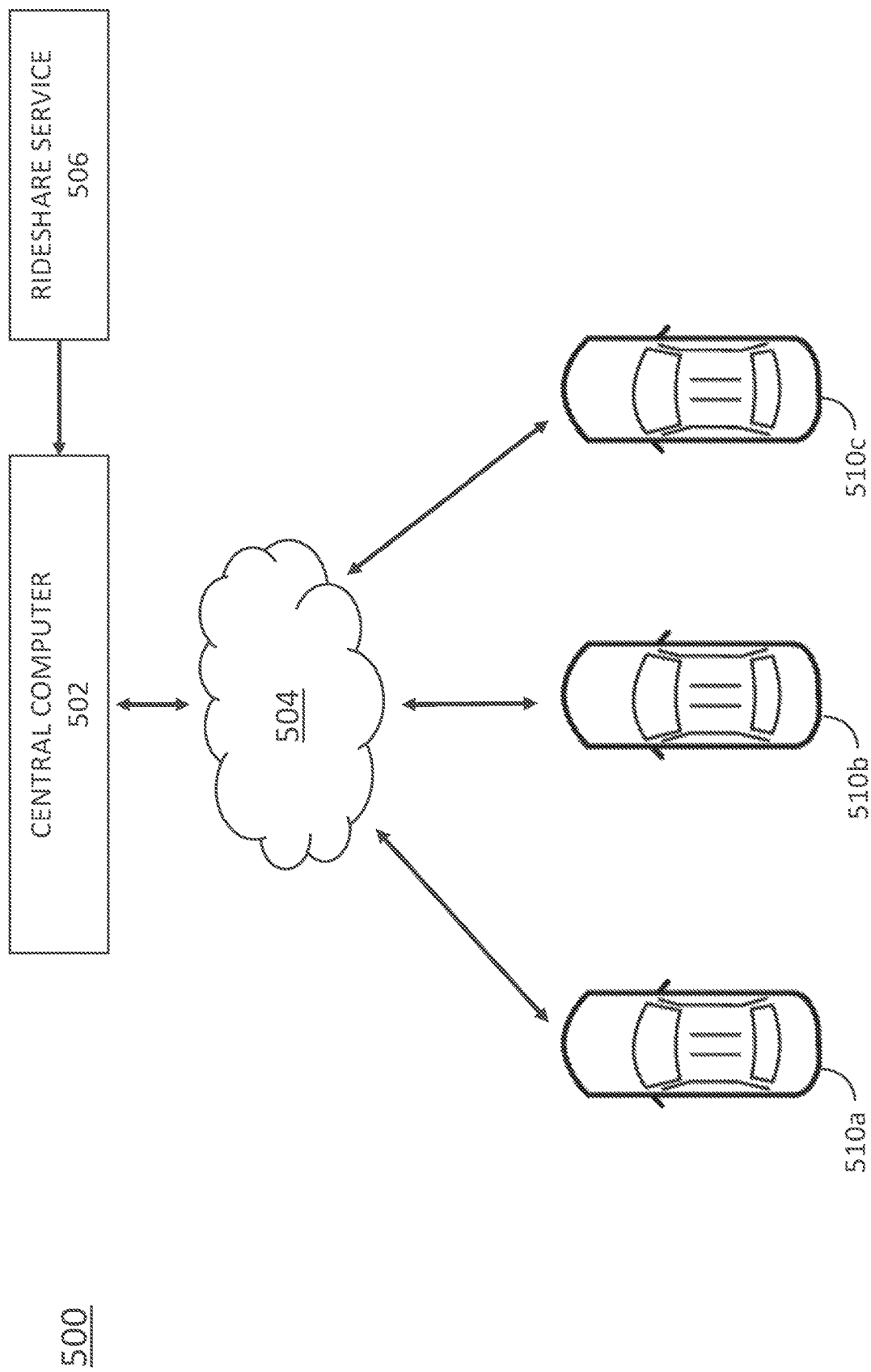
FIG. 5 is a diagram illustrating a fleet of autonomous vehicles in communication with a central computer, according to some embodiments of the disclosure.

FIG. 5 is a diagram 500 illustrating a fleet of autonomous vehicles 510a, 510b, 510c in communication with a central computer 502, according to some embodiments of the disclosure. The vehicles 510a-510c communicate wirelessly with a cloud 504 and a central computer 502. The central computer 502 includes a routing coordinator and a database of information from the vehicles 510a-510c in the fleet. Autonomous vehicle fleet routing refers to the routing of multiple vehicles in a fleet. The central computer also acts as a centralized ride management system and communicates with ridehail users via a ridehail service 506. Via the ridehail service 506, the central computer receives ride requests from various user ridehail applications and the ridehail service adjusts adaptive privacy settings as described herein. In some implementations, the autonomous vehicles 510a-510c communicate directly with each other.

When a ride request is entered at a ridehail service 506, the ridehail service 506 sends the request to central computer 502. If the ridehail request is for a future date, the central computer 502 stores the information for future routing determinations. In some examples, on the day of the ride request, during a selected period of time before the ride begins, the vehicle to fulfill the request is selected and route for the vehicle is generated by the routing coordinator. In other examples, the vehicle to fulfill the request is selected and the route for the vehicle is generated by the onboard computer on the autonomous vehicle. In various examples, information pertaining to the ride, such as passenger privacy settings, is transmitted to the selected vehicle 510a-510c. With shared rides, the route for the vehicle can depend on other passenger pick-up and drop-off locations. Each of the autonomous vehicles 410a, 410b, 410c in the fleet are equipped to participate in providing personal identifiable information privacy protection services as described with respect to FIGS. 2 and 3. The vehicles 510a, 510b, 510c communicate with the central computer 502 via the cloud 504.

As described above, each vehicle 510a-510c in the fleet of vehicles communicates with a routing coordinator. Thus, information gathered by various autonomous vehicles 510a-510c in the fleet can be saved and used to generate information for future routing determinations. For example, sensor data can be used to generate route determination parameters. In general, the information collected from the vehicles in the fleet can be used for route generation or to modify existing routes. In some examples, the routing coordinator collects and processes position data from multiple autonomous vehicles in real-time to avoid traffic and generate a fastest-time route for each autonomous vehicle. In some implementations, the routing coordinator uses collected position data to generate a best route for an autonomous vehicle in view of one or more travelling preferences and/or routing goals. In some examples, a travelling preference includes a request for a longer ride to accommodate planned in-vehicle activities. In some examples, the routing coordinator uses collected position data corresponding to emergency events to generate a best route for an autonomous vehicle to avoid a potential emergency situation and associated unknowns.

According to various implementations, a set of parameters can be established that determine which metrics are considered (and to what extent) in determining routes or route modifications. For example, expected congestion or traffic based on a known event can be considered. Generally, a routing goal refers to, but is not limited to, one or more desired attributes of a routing plan indicated by at least one of an administrator of a routing server and a user of the autonomous vehicle. The desired attributes may relate to a desired duration of a route plan, a comfort level of the route plan, a vehicle type for a route plan, safety of the route plan, and the like. For example, a routing goal may include time of an individual trip for an individual autonomous vehicle to be minimized, subject to other constraints. As another example, a routing goal may be that comfort of an individual trip for an autonomous vehicle be enhanced or maximized, subject to other constraints.

Routing goals may be specific or general in terms of both the vehicles they are applied to and over what timeframe they are applied. As an example of routing goal specificity in vehicles, a routing goal may apply only to a specific vehicle, or to all vehicles in a specific region, or to all vehicles of a specific type, etc. Routing goal timeframe may affect both when the goal is applied (e.g., some goals may be 'active' only during set times) and how the goal is evaluated (e.g., for a longer-term goal, it may be acceptable to make some decisions that do not optimize for the goal in the short term, but may aid the goal in the long term). Likewise, routing vehicle specificity may also affect how the goal is evaluated; e.g., decisions not optimizing for a goal may be acceptable for some vehicles if the decisions aid optimization of the goal across an entire fleet of vehicles.

Some examples of routing goals include goals involving trip duration (either per trip, or average trip duration across some set of vehicles and/or times), physics, laws, and/or company policies (e.g., adjusting routes chosen by users that end in lakes or the middle of intersections, refusing to take routes on highways, etc.), distance, velocity (e.g., max., min., average), source/destination (e.g., it may be optimal for vehicles to start/end up in a certain place such as in a pre-approved parking space or charging station), intended arrival time (e.g., when a user wants to arrive at a destination), duty cycle (e.g., how often a car is on an active trip vs. idle), energy consumption (e.g., gasoline or electrical energy), maintenance cost (e.g., estimated wear and tear), money earned (e.g., for vehicles used for ridehailing), person-distance (e.g., the number of people moved multiplied by the distance moved), occupancy percentage, higher confidence of arrival time, user-defined routes or waypoints, fuel status (e.g., how charged a battery is, how much gas is in the tank), passenger satisfaction (e.g., meeting goals set by or set for a passenger) or comfort goals, environmental impact, passenger safety, pedestrian safety, toll cost, etc. In examples where vehicle demand is important, routing goals may include attempting to address or meet vehicle demand.

Routing goals may be combined in any manner to form composite routing goals; for example, a composite routing goal may attempt to optimize a performance metric that takes as input trip duration, ridehail revenue, and energy usage and also, optimize a comfort metric. The components or inputs of a composite routing goal may be weighted differently and based on one or more routing coordinator directives and/or passenger preferences.

Likewise, routing goals may be prioritized or weighted in any manner. For example, a set of routing goals may be prioritized in one environment, while another set may be prioritized in a second environment. As a second example, a set of routing goals may be prioritized until the set reaches threshold values, after which point a second set of routing goals take priority. Routing goals and routing goal priorities may be set by any suitable source (e.g., an autonomous vehicle routing platform, an autonomous vehicle passenger).

The routing coordinator uses maps to select an autonomous vehicle from the fleet to fulfill a ride request. In some implementations, the routing coordinator sends the selected autonomous vehicle the ride request details, including pickup location and destination location, and an onboard computer on the selected autonomous vehicle generates a route and navigates to the destination. In some implementations, the routing coordinator in the central computing system 502 generates a route for each selected autonomous vehicle 510*a*-510*c*, and the routing coordinator determines a route for the autonomous vehicle 510*a*-510*c* to travel from the autonomous vehicle's current location to a first destination.

Example of a Computing System for Ride Requests

Figure 6:
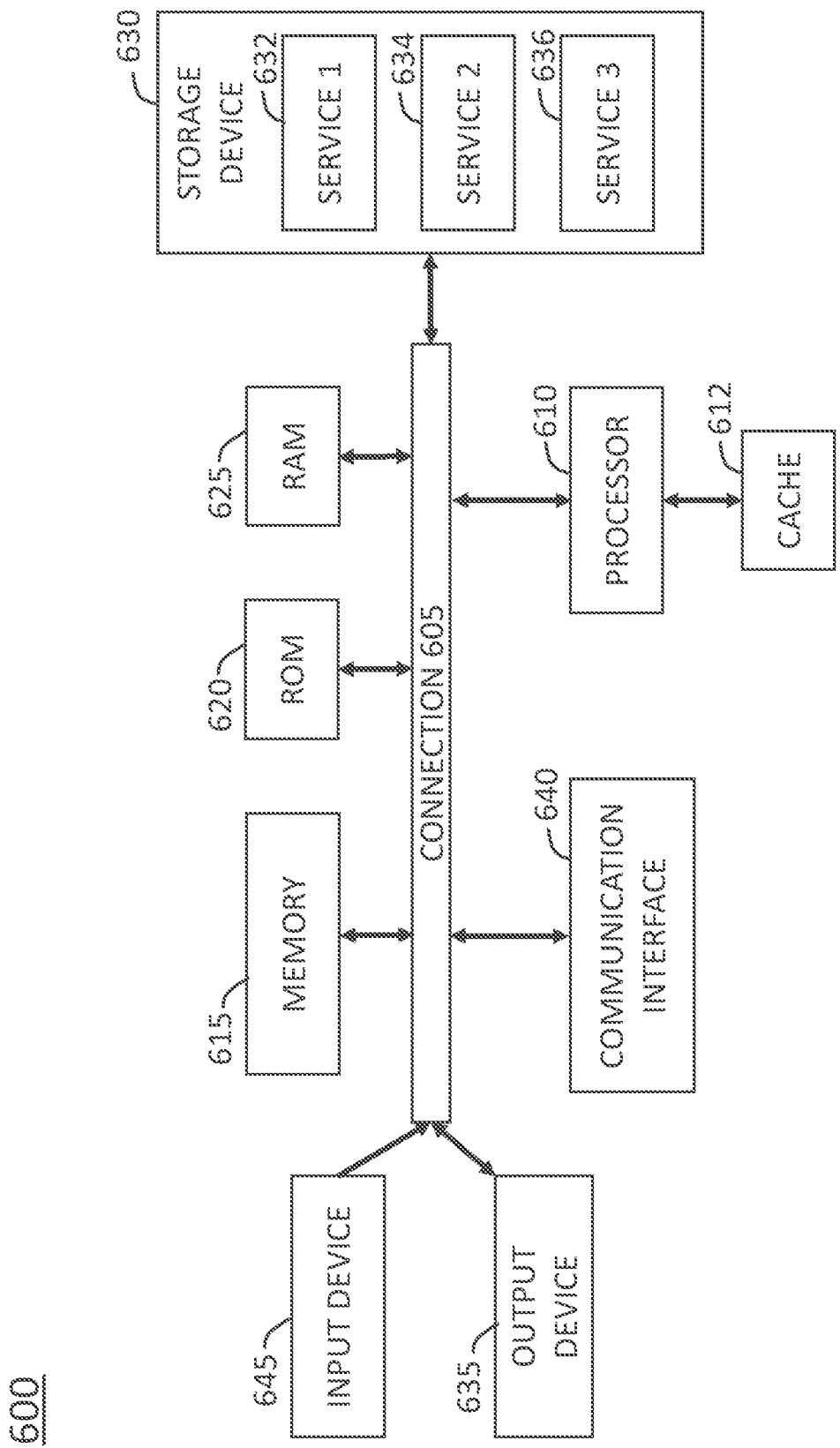
FIG. 6 shows an example embodiment of a system for implementing certain aspects of the present technology.

FIG. 6 shows an example embodiment of a computing system 600 for implementing certain aspects of the present technology. In various examples, the computing system 600 can be any computing device making up the onboard computer 104, the central computer 502, or any other computing system described herein. The computing system 600 can include any component of a computing system described herein which the components of the system are in communication with each other using connection 605. The connection 605 can be a physical connection via a bus, or a direct connection into processor 610, such as in a chipset architecture. The connection 605 can also be a virtual connection, networked connection, or logical connection.

In some implementations, the computing system 600 is a distributed system in which the functions described in this disclosure can be distributed within a datacenter, multiple data centers, a peer network, etc. In some embodiments, one or more of the described system components represents many such components each performing some or all of the functions for which the component is described. In some embodiments, the components can be physical or virtual devices.

The example system 600 includes at least one processing unit (CPU or processor) 610 and a connection 605 that couples various system components including system memory 615, such as read-only memory (ROM) 620 and random access memory (RAM) 625 to processor 610. The computing system 600 can include a cache of high-speed memory 612 connected directly with, in close proximity to, or integrated as part of the processor 610.

The processor 610 can include any general-purpose processor and a hardware service or software service, such as services 632, 634, and 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction, the computing system 600 includes an input device 645, which can represent any number of input mechanisms, such as a microphone for speech, a touch-sensitive screen for gesture or graphical input, keyboard, mouse, motion input, speech, etc. The computing system 600 can also include an output device 635, which can be one or more of a number of output mechanisms known to those of skill in the art. In some instances, multimodal systems can enable a user to provide multiple types of input/output to communicate with the computing system 600. The computing system 600 can include a communications interface 640, which can generally govern and manage the user input and system output. There is no restriction on operating on any particular hardware arrangement, and therefore the basic features here may easily be substituted for improved hardware or firmware arrangements as they are developed.

A storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as a processor 610, a connection 605, an output device 635, etc., to carry out the function.

As discussed above, each vehicle in a fleet of vehicles communicates with a routing coordinator. When a vehicle is flagged for service, the routing coordinator schedules the vehicle for service and routes the vehicle to the service center. When the vehicle is flagged for maintenance, a level of importance or immediacy of the service can be included. As such, service with a low level of immediacy will be scheduled at a convenient time for the vehicle and for the fleet of vehicles to minimize vehicle downtime and to minimize the number of vehicles removed from service at any given time. In some examples, the service is performed as part of a regularly-scheduled service. Service with a high level of immediacy may require removing vehicles from service despite an active need for the vehicles.

Routing goals may be specific or general in terms of both the vehicles they are applied to and over what timeframe they are applied. As an example of routing goal specificity in vehicles, a routing goal may apply only to a specific vehicle, or to all vehicles of a specific type, etc. Routing goal timeframe may affect both when the goal is applied (e.g., urgency of the goal, or, some goals may be 'active' only during set times) and how the goal is evaluated (e.g., for a longer-term goal, it may be acceptable to make some decisions that do not optimize for the goal in the short term, but may aid the goal in the long term). Likewise, routing vehicle specificity may also affect how the goal is evaluated; e.g., decisions not optimizing for a goal may be acceptable for some vehicles if the decisions aid optimization of the goal across an entire fleet of vehicles.

In various implementations, the routing coordinator is a remote server or a distributed computing system connected to the autonomous vehicles via an internet connection. In some implementations, the routing coordinator is any suitable computing system. In some examples, the routing coordinator is a collection of autonomous vehicle computers working as a distributed system.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Select Examples

Example 1 provides a method for adaptive privacy settings, comprising: receiving a shared ride request for a first passenger ride including a first pick-up location and a first drop-off location; selecting an autonomous vehicle to fulfill the shared ride request; determining that a second passenger is in the autonomous vehicle during at least a portion of the first passenger ride; and adapting in-cabin privacy settings to protect first and second passenger personally identifiable information, during the portion of the first passenger ride.

Example 2 provides a method according to one or more of the preceding and/or following examples, further comprising restricting available in-cabin features during the portion of the first passenger ride.

Example 3 provides a method according to one or more of the preceding and/or following examples, wherein adapting in-cabin privacy settings to protect first and second passenger personally identifiable information includes adapting information displayed on a display screen, and the adapting the information includes at least one of changing a name, removing a name, changing an address, hiding address information, and hiding preferences.

Example 4 provides a method according to one or more of the preceding and/or following examples, further comprising: determining a first passenger seat location in the autonomous vehicle; and determining a second passenger seat location in the autonomous vehicle.

Example 5 provides a method according to one or more of the preceding and/or following examples, further comprising: determining that a first passenger display screen is visible from the second passenger seat location; and redacting the first passenger personally identifiable information from the first passenger display screen.

Example 6 provides a method according to one or more of the preceding and/or following examples, further comprising: providing the first passenger personally identifiable information to a first passenger via a secure interface, wherein the secure interface is out of a second passenger field of view.

Example 7 provides a method according to one or more of the preceding and/or following examples, further comprising receiving first passenger shared ride privacy preferences.

Example 8 provides a method according to one or more of the preceding and/or following examples, wherein determining that the second passenger is in the autonomous vehicle during the portion of the first passenger ride comprises determining that the second passenger is in the autonomous vehicle at first passenger pick-up, and further comprising: identifying a suggested pick-up location a selected distance from the first pick-up location and providing the suggested pick-up location to a first passenger mobile device.

Example 9 provides a method according to one or more of the preceding and/or following examples, wherein determining that the second passenger is in the autonomous vehicle during the portion of the first passenger ride comprises determining that the second passenger is in the autonomous vehicle at first passenger drop-off, and further comprising: identifying a suggested drop-off location a selected distance from the first drop-off location and providing the suggested drop-off location to a first passenger mobile device.

Example 10 provides a system for adaptive privacy settings in an autonomous vehicle fleet, comprising: a ridehail application configured to: receive an autonomous vehicle shared ride request for a first passenger ride including a first pick-up location, a first drop-off location, and shared ride privacy settings; and a central computing system configured to: receive the autonomous vehicle shared ride request for the first passenger ride, select an autonomous vehicle for the shared ride request from the autonomous vehicle fleet, determine that a second passenger is scheduled to be in the autonomous vehicle during at least a portion of the first passenger ride, and transmit the shared ride privacy settings to the autonomous vehicle.

Example 11 provides a system according to one or more of the preceding and/or following examples, wherein the shared ride privacy settings include removing first passenger personally identifiable information from autonomous vehicle visual displays and in-cabin audio, and wherein the autonomous vehicle is configured to apply the shared ride privacy settings inside a vehicle cabin.

Example 12 provides a system according to one or more of the preceding and/or following examples, wherein the autonomous vehicle is configured to communicate the first passenger personally identifiable information to a first passenger via a secure interface, wherein the secure interface is out of a second passenger field of view.

Example 13 provides a system according to one or more of the preceding and/or following examples, wherein the central computing system is further configured to: determine that the second passenger scheduled to be in the autonomous vehicle during the portion of the first passenger ride that includes first passenger pick-up, and identify a suggested pick-up location a selected distance from the first pick-up location and provide the suggested pick-up location to the ridehail application.

Example 14 provides a system according to one or more of the preceding and/or following examples, wherein the central computing system is further configured to: determine that the second passenger scheduled to be in the autonomous vehicle during the portion of the first passenger ride that includes first passenger drop-off, and identify a suggested drop-off location a selected distance from the first drop-off location and provide the suggested drop-off location to the ridehail application.

Example 15 provides an autonomous vehicle for adapting privacy settings, comprising: a plurality of sensors inside the autonomous vehicle configured to detect first and second passengers in the autonomous vehicle cabin; and an onboard computer in the autonomous vehicle configured to: determine that the first and second passengers are unconnected; and adapt in-cabin settings to protect first and second passenger personally identifiable information, including modifying information displayed on a display screen and modifying information played over in-cabin loudspeakers.

Example 16 provides an autonomous vehicle according to one or more of the preceding and/or following examples, wherein the onboard computer is further configured to determine when the autonomous vehicle cabin is occupied by a single passenger and adapt the in-cabin settings to a full feature mode.

Example 17 provides an autonomous vehicle according to one or more of the preceding and/or following examples, wherein the onboard computer is further configured to receive first and second passenger privacy settings, and wherein the in-cabin settings are adjusted according to the first and second passenger privacy settings.

Example 18 provides an autonomous vehicle according to one or more of the preceding and/or following examples, wherein the onboard computer is configured to send first passenger personally identifiable information to a first passenger mobile device and to send second passenger personally identifiable information to a second passenger mobile device.

Example 19 provides an autonomous vehicle according to one or more of the preceding and/or following examples, wherein the onboard computer is further configured to receive sensor data from the plurality of sensors and determine a first passenger seat location and a second passenger seat location.

Example 20 provides an autonomous vehicle according to one or more of the preceding and/or following examples, wherein the onboard computer is further configured to: determine that a first passenger display screen is visible from the second passenger seat location; and redact the first passenger personally identifiable information from the first passenger display screen.

Example 21 provides an autonomous vehicle according to one or more of the preceding and/or following examples, wherein the onboard computer is further configured to communicate with a central computing system, the central computing system is configured to receive a shared ride request for a first passenger ride including first passenger privacy settings, and transmit the shared ride request to the onboard computer.

Example 22 provides a method for adaptive privacy settings, comprising: determining that a first and second unrelated passengers are in an autonomous vehicle during a shared ride; adapting in-cabin privacy settings to protect first and second passenger personally identifiable information, during the shared ride, wherein adapting in-cabin privacy settings includes obfuscating passenger names and addresses.

Variations and Implementations

According to various examples, driving behavior includes any information relating to how an autonomous vehicle drives. For example, driving behavior includes how and when the autonomous vehicle actuates its brakes and its accelerator, and how it steers. In particular, the autonomous vehicle is given a set of instructions (e.g., a route or plan), and the driving behavior determines how the set of instructions is implemented to drive the car to and from various destinations, and, potentially, to stop for passengers or items. Driving behavior may include a description of a controlled operation and movement of an autonomous vehicle and the manner in which the autonomous vehicle applies traffic rules during one or more driving sessions. Driving behavior may additionally or alternatively include any information about how an autonomous vehicle calculates routes (e.g., prioritizing fastest time vs. shortest distance), other autonomous vehicle actuation behavior (e.g., actuation of lights, windshield wipers, traction control settings, etc.) and/or how an autonomous vehicle responds to environmental stimulus (e.g., how an autonomous vehicle behaves if it is raining, or if an animal jumps in front of the vehicle). Some examples of elements that may contribute to driving behavior include acceleration constraints, deceleration constraints, speed constraints, steering constraints, suspension settings, routing preferences (e.g., scenic routes, faster routes, no highways), lighting preferences, "legal ambiguity" conduct (e.g., in a solid-green left turn situation, whether a vehicle pulls out into the intersection or waits at the intersection line), action profiles (e.g., how a vehicle turns, changes lanes, or performs a driving maneuver), and action frequency constraints (e.g., how often a vehicle changes lanes). Additionally, driving behavior includes information relating to whether the autonomous vehicle drives and/or parks.

As will be appreciated by one skilled in the art, aspects of the present disclosure, in particular aspects of a perception system for an autonomous vehicle, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer readable medium(s), preferably non-transitory, having computer readable program code embodied, e.g., stored, thereon. In various embodiments, such a computer program may, for example, be downloaded (updated) to the existing devices and systems (e.g. to the existing perception system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The preceding disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Other features and advantages of the disclosure will be apparent from the description and the claims. Note that all optional features of the apparatus described above may also be implemented with respect to the method or process described herein and specifics in the examples may be used anywhere in one or more embodiments.

The 'means for' in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

What is claimed is:

1. A method for adaptive privacy settings, comprising:
receiving a shared ride request for a first passenger ride including a first pick-up location and a first drop-off location;
selecting an autonomous vehicle to fulfill the shared ride request;
determining that a second passenger is in the autonomous vehicle during at least a portion of the first passenger ride based on signals from a set of sensors of the autonomous vehicle; and
adapting, in response to the determination that the second passenger is in the autonomous vehicle, in-cabin privacy settings to protect first and second passenger personally identifiable information, during the portion of the first passenger ride,
wherein the adapting in-cabin privacy settings includes adjusting windows in the autonomous vehicle to prevent a reflection of a mobile device screen of the first passenger being visible to the second passenger.

2. The method of claim 1, further comprising restricting available in-cabin features during the portion of the first passenger ride.

3. The method of claim 1, wherein adapting in-cabin privacy settings to protect first and second passenger personally identifiable information includes adapting information displayed on a display screen, and the adapting the information includes at least one of changing a name, removing a name, changing an address, hiding address information, and hiding preferences.

4. The method of claim 1, further comprising:
determining a first passenger seat location in the autonomous vehicle; and
determining a second passenger seat location in the autonomous vehicle.

5. The method of claim 4, further comprising:
determining that a first passenger first display screen is visible from the second passenger seat location and a first passenger second display screen is not visible from the second passenger seat location; and
redacting, based on determining that the first passenger first display screen is visible from the second passenger seat location and the first passenger second display screen is not visible from the second passenger seat location, the first passenger personally identifiable information from the first passenger first display screen while displaying the first passenger personally identifiable information on the first passenger second display screen.

6. The method of claim 4, further comprising providing the first passenger personally identifiable information to a first passenger via a secure interface, wherein the secure interface is out of a second passenger field of view.

7. The method of claim 1, further comprising receiving first passenger shared ride privacy preferences.

8. The method of claim 1, wherein determining that the second passenger is in the autonomous vehicle during the portion of the first passenger ride comprises determining that the second passenger is in the autonomous vehicle at first passenger pick-up, and further comprising:
identifying a suggested pick-up location a selected distance from the first pick-up location and providing the suggested pick-up location to a first passenger mobile device.

9. The method of claim 1, wherein determining that the second passenger is in the autonomous vehicle during the portion of the first passenger ride comprises determining that the second passenger is in the autonomous vehicle at first passenger drop-off, and further comprising:
identifying a suggested drop-off location a selected distance from the first drop-off location and providing the suggested drop-off location to a first passenger mobile device.

10. A system for adaptive privacy settings in an autonomous vehicle fleet, comprising:
a ridehail application configured to:
receive an autonomous vehicle shared ride request for a first passenger ride including a first pick-up location, a first drop-off location, and shared ride privacy settings; and
a central computing system configured to:
receive the autonomous vehicle shared ride request for the first passenger ride,
select an autonomous vehicle for the shared ride request from the autonomous vehicle fleet,
determine that a second passenger is scheduled to be in the autonomous vehicle during at least a portion of the first passenger ride based on signals from a set of sensors of the autonomous vehicle, and
transmit, in response to the determination that the second passenger is in the autonomous vehicle, the shared ride privacy settings to the autonomous vehicle including a preference to adjust the windows in the autonomous vehicle to prevent a reflection of a mobile device screen of the first passenger being visible to the second passenger.

11. The system of claim 10, wherein the shared ride privacy settings include removing first passenger personally identifiable information from autonomous vehicle visual displays and in-cabin audio, and wherein the autonomous vehicle is configured to apply the shared ride privacy settings inside a vehicle cabin.

12. The system of claim 11, wherein the autonomous vehicle is configured to communicate the first passenger personally identifiable information to a first passenger via a secure interface, wherein the secure interface is out of a second passenger field of view.

13. The system of claim 10, wherein the central computing system is further configured to:
determine that the second passenger scheduled to be in the autonomous vehicle during the portion of the first passenger ride that includes first passenger pick-up, and
identify a suggested pick-up location a selected distance from the first pick-up location and provide the suggested pick-up location to the ridehail application.

14. The system of claim 10, wherein the central computing system is further configured to:
determine that the second passenger scheduled to be in the autonomous vehicle during the portion of the first passenger ride that includes first passenger drop-off, and
identify a suggested drop-off location a selected distance from the first drop-off location and provide the suggested drop-off location to the ridehail application.

15. An autonomous vehicle for adapting privacy settings, comprising:
a plurality of sensors inside the autonomous vehicle configured to detect first and second passengers in the autonomous vehicle cabin; and
an onboard computer in the autonomous vehicle configured to:
receive a shared ride request for a first passenger ride for the first passenger including a first pick-up location and a first drop-off location;
select an autonomous vehicle to fulfill the shared ride request;
determine that the second passenger is in the autonomous vehicle during at least a portion of the first passenger ride based on signals from a set of sensors of the autonomous vehicle; and
adapt, in response to the determination that the second passenger is in the autonomous vehicle, in-cabin privacy settings to protect first and second passenger personally identifiable information, during the portion of the first passenger ride,
wherein the adapting in-cabin privacy settings includes adjusting windows in the autonomous vehicle to prevent a reflection of a mobile device screen of the first passenger being visible to the second passenger.

16. The autonomous vehicle of claim 15, wherein the onboard computer is further configured to determine when the autonomous vehicle cabin is occupied by a single passenger and adapt the in-cabin settings to a full feature mode.

17. The autonomous vehicle of claim 15, wherein the onboard computer is configured to send first passenger personally identifiable information to a first passenger mobile device and to send second passenger personally identifiable information to a second passenger mobile device.

18. The autonomous vehicle of claim 15, wherein the onboard computer is further configured to receive sensor data from the plurality of sensors and determine a first passenger seat location and a second passenger seat location.

19. The autonomous vehicle of claim 18, wherein the onboard computer is further configured to:
determine that a first passenger display screen is visible from the second passenger seat location; and
redact the first passenger personally identifiable information from the first passenger display screen.

20. The autonomous vehicle of claim 15, wherein the onboard computer is further configured to:
determine that the first and second passengers are unconnected, wherein when the first and second passengers are associated with a same business the first and second passengers are determined to be connected and when the first and second passengers are not associated with a same business the first and second passengers are determined to be unconnected; and adapt, in response to the determination that the first and second passengers are unconnected, in-cabin settings to protect first and second passenger personally identifiable information, including modifying information displayed on a display screen and modifying information played over in-cabin loudspeakers.

\* \* \* \* \*